United States Patent [19]

Fesman

[11] Patent Number: 4,880,844
[45] Date of Patent: Nov. 14, 1989

[54] FLAME LAMINATABLE POLYETHER URETHANE FOAM

[75] Inventor: Gerald Fesman, Teaneck, N.J.
[73] Assignee: Akzo America Inc., New York, N.Y.
[21] Appl. No.: 199,499
[22] Filed: May 27, 1988
[51] Int. Cl.$^4$ ............................................. C08G 18/65
[52] U.S. Cl. ..................................... 521/107; 521/108; 521/131; 521/155; 521/170; 521/174
[58] Field of Search ............... 521/107, 108, 131, 170, 521/174, 155

[56] References Cited

U.S. PATENT DOCUMENTS

| | | | |
|---|---|---|---|
| 4,544,678 | 10/1985 | Fesman | 521/107 |
| 4,546,116 | 10/1985 | Muller et al. | 521/106 |
| 4,587,273 | 5/1986 | Shimomura | 521/107 |
| 4,616,044 | 10/1986 | Fesman | 521/107 |
| 4,696,952 | 9/1987 | Shimomura et al. | 521/107 |
| 4,714,717 | 12/1987 | Londrigan et al. | 521/131 |

FOREIGN PATENT DOCUMENTS

| | | |
|---|---|---|
| 743057 | 9/1966 | Canada . |
| 58/19321 | 7/1981 | Japan . |
| 60/139445 | 12/1983 | Japan . |
| 61/141722 | 12/1984 | Japan . |
| 61/157514 | 12/1984 | Japan . |
| 62/79218 | 10/1985 | Japan . |

*Primary Examiner*—Maurice J. Welsh
*Assistant Examiner*—L. Henderson
*Attorney, Agent, or Firm*—Richard P. Fennelly; Louis A. Morris

[57] ABSTRACT

Polyether flexible urethane foams are rendered flame laminatable by use of a combination of an organophosphorus additive to confer flame laminatable properties on the foam and a polyalkylene glycol additive to improve the flame laminatable properties. A halogenated flame retardant is preferably also contained in the foam.

14 Claims, No Drawings

FLAME LAMINATABLE POLYETHER URETHANE FOAM

BACKGROUND OF THE INVENTION

1. Field of the Invention

The present invention relates to laminates of a substrate and a polyether urethane foam and particularly to laminates that are produced by heat sealing. More particularly, the invention relates to urethane foam laminates wherein the urethane foam is treated with a phosphorus-containing additive and a polyalkylene glycol additive.

2. Description of the Prior Art

In U.S. Pat. No. 4,616,044, issued Oct. 7, 1986, a heat laminatable polyether urethane foam is described which contains an effective amount of an organophosphorus additive to impart heat laminatable properties on the resulting foam. The organophosphorus additives that are described in this patent include organophosphites derived from phosphorus acid, organophosphonates derived from phosphonic acid, and organophosphates derived from phosphoric acid.

U.S. Pat. No. 4,696,952 relates to the production of polyurethane foams having good skin weld ability. The foams that are described in this patent use a flame retardant which is a triaryl phosphate ester which is described as having the disadvantage of markedly impairing the weldability of the product. In order to improve the flame retardance and weldability of the resulting foam, a combination of a high molecular weight polyhydroxy compound and a low molecular weight polyhydroxy compound is proposed for use. The high molecular weight polyhydroxy compound is similar to the conventional materials that are used as the basis for polyurethane foams. The low molecular weight polyhydroxy compound which is present in much lower amount is indicated as being an aliphatic alcohol having a hydroxy number of greater than 560 with 2 to 4 hydroxy groups in the molecule. Examples of such compounds include ethylene glycol, propylene glycol, diethylene glycol, dipropylene glycol, 1,4-butanediol, 1,3-propanediol, and triethylene glycol. Other examples include such triols as glycerol, trimethylolpropane, triethylolpropane, trimethylolethane, triethylolethane, pentaerythritol, and 1,2,6-hexanetriol.

SUMMARY OF THE INVENTION

The present invention is a heat laminatable polyether urethane foam composition which comprises the types of organophosphorus additives described in U.S. Pat. No. 4,616,044 in combination with an effective amount of a polyalkylene glycol additive to improve the flame lamination characteristics of such a foam.

DETAILED DESCRIPTION OF THE PRESENT INVENTION

The text of U.S. Pat. No. 4,616,044 from Col. 2, line 54 through Col. 7, line 60 gives a generalized description of the type of foam formulation which forms the basis of the present invention. The entire text of such patent at those portions is incorporated herein by reference as showing the basic ingredients that are used to constitute the foam-forming mixtures which are used in the present invention: (A) polyether polyol, (B) organoisocyanate, (C) blowing agent, (D) polyurethane catalyst, (E) surfactant, and (F) organophosphorus additive used to confer heat laminatable properties.

The polyether polyol ingredients, in summary, are those used in the preparation of flexible ether-type polyurethane foams and include the polyoxyalkylene polyether polyols. Preferably, these polyols have molecular weights of from 2,000 to 6,000 and an average hydroxy functionality of from about 2 to about 3.

The organopolyisocyanate ingredient preferably has an isocyanate functionality of from 2 to 3 and includes toluene diisocyanate as a preferred ingredient.

The blowing agent can comprise water alone or water in combination with other blowing agents having a boiling point of from −30° C. to 60° C.

The polyurethane catalyst can include tertiary amines and such metal compounds as stannous octoate and dibutyltin dilaurate.

Surfactants that can be used include non-hydrolyzable silicone surfactants that are known to persons of ordinary skill in the art.

The organophosphorus additive, as mentioned before, includes organophosphites, organophosphonates and organophosphates (i.e., alkyl phosphates and alkoxyalkylphosphates) as more fully described in U.S. Pat. No. 4,616,044 at Col. 4, line 3, to Col. 5, line 31, which are incorporated herein by reference.

In addition to the foregoing materials, the flame laminatable polyether urethane foam of the instant invention can comprise a halogenated flame retardant. This flame retardant appears to act as a processing aid and/or controller when used in conjunction with the aforementioned ingredients. Suitable halogenated flame retardants as used in the context of the present invention include halogenated hydrocarbons and halogenated organophosphorus compounds. A representative listing is given at Col. 5, line 51 to line 64 of U.S. Pat. No. 4,616,044 which is incorporated herein by reference. The amount of organophosphorus compound to confer flame laminatable properties on the foam can range from about 1 part to about 10 parts by weight per 100 parts by weight of polyol used with the amount of halogenated flame retardant ranging from about 5 parts to about 20 parts by weight per 100 parts by weight of polyol used.

In accordance with the present invention, the novel additive of the instant invention is a polyalkylene glycol additive to further improve the flame lamination properties of the resulting foam over the type of foam described and claimed in U.S. Pat. No. 4,616,044. Generally speaking, the amount of polyalkylene glycol that can be used ranges from about 1 to about 10 parts by weight per 100 parts by weight of polyol. Representative polyalkylene glycol materials that can be used include polyethylene glycol having the general formula $H(OCH_2CH_2)_nOH$ where n ranges from about 6 to about 20, and polypropylene glycol of the formula $H(OC_3H_6)_nOH$ where n ranges from about 4 to about 10. These glycol materials will have a hydroxy number range of below about 560.

The foregoing illustrates certain embodiments of the present invention with the Examples which follow illustrating more specific embodiments.

EXAMPLE

A series of polyurethane foams was prepared and subjected to a flame lamination procedure as described in U.S. Pat. No. 4,652,485, which is incorporated herein by reference. The ingredients used were as follows:

| Basic Ingredients | 1 | 2 | 3 | 4 |
|---|---|---|---|---|
| Polyether Polyol | 100 | 100 | 100 | 100 |
| Toluene Diisocyanate | 52.5 | 53.5 | 51.5 | 55.1 |
| Silicone Surfactant | 1.4 | 1.4 | 1.4 | 1.4 |
| Stannous Octoate | 0.18 | 0.17 | 0.20 | 0.17 |
| N—ethyl Morpholine | 1.3 | 1.3 | 1.3 | 1.3 |
| Methylene Chloride | 1.5 | 1.5 | 1.5 | 1.5 |
| Water | 3.85 | 3.85 | 3.85 | 3.85 |
| Additives | | | | |
| Polyethylene Glycol (molecular weight = 600) | 2.0 | 5.0 | — | 10.0 |
| Diethyl N,N—bis(2-hydroxyethyl)aminomethyl-phosphonate | 0.5 | 0.5 | — | — |
| Mixture of 75 pbw tris(mono and dinonylphenyl) phosphate and 25 pbw butylated triphenyl phosphate | 8.0 | 5.0 | 10.0 | — |
| Results: | VG | E | VG | G |

| Basic Ingredients | 5 | 6 | 7 | 8 |
|---|---|---|---|---|
| Polyether Polyol | 100 | 100 | 100 | 100 |
| Toluene Diisocyanate | 55.1 | 53.5 | 53.5 | 51.5 |
| Silicone Surfactant | 1.4 | 1.4 | 1.4 | 1.4 |
| Stannous Octoate | 0.17 | 0.17 | 0.20 | 0.17 |
| N—ethyl Morpholine | 1.3 | 1.3 | 1.3 | 1.3 |
| Methylene Chloride | 1.5 | 1.5 | 1.5 | 1.5 |
| Water | 3.85 | 3.85 | 3.85 | 3.85 |
| Additives | | | | |
| Polyethylene Glycol | 10.0 | 5.0 | 5.0 | — |
| Diethyl N,N—bis(2-hydroxyethyl)aminomethyl-phosphonate | 0.5 | 0.5 | — | 0.5 |
| Mixture of 75 pbw tris(mono and dinonylphenyl) phosphate and 25 pbw butylated triphenyl phosphate | — | — | 10.0 | — |
| Results: | E | VG | VG | G |

In the above listing the Results section gives the results of the bond strength of the cooled laminate between a fabric and the melted surface of the foam. This strength, also known as "peel strength", was tested by a tugging attempt to separate the fabric from the foam. An excellent ("E") rating indicates that the bond strength approached the tensile strength of the original foam. A very good ("VG") rating had a lower bond strength with a good ("G") rating being still lower.

The foregoing Example illustrates certain specific embodiments of the present invention which are presented for illustrative purposes only. They should not be construed in a limiting sense. The scope of protection that is sought is set forth in the claims which follow.

I claim:

1. In a urethane foam-forming composition comprising a polyether polyol, organoisocyanate, blowing agent and at least one organophosphorus compound selected from the group consisting of an organophosphite, an organophosphonate, an alkylphosphate and an alkoxyalkylphosphate in an amount effective to impart heat laminatable properties to the resulting foam formed therefrom, wherein the improvement comprises the additional presence of a polyalkylene glycol having a hydroxy number of below about 560 to improve the heat laminatable properties of the resulting foam.

2. A composition as claimed in claim 1 which also comprises a halogenated flame retardant.

3. The heat laminatable polyether urethane foam formed from the composition of claim 1.

4. The heat laminatable polyether urethane foam formed from the composition of claim 2.

5. A composition as claimed in claim 1 wherein the organophosphorus compound ranges from about 1 part to about 10 parts by weight per 100 parts by weight of polyol used to form the foam and wherein the composition also comprises from about 5 parts to about 20 parts by weight per 100 parts by weight of polyol of a halogenated flame retardant.

6. A composition as claimed in claim 1 wherein the polyalkylene glycol is present at from about 1 to about 10 parts by weight per 100 parts by weight of polyol used to make the foam.

7. A composition as claimed in claim 5 wherein the polyalkylene glycol is present at from about 1 to about 10 parts by weight per 100 parts by weight of polyol used to make the foam.

8. A composition as claimed in claim 1 wherein the polyalkylene glycol is a polyethylene glycol of the formula $H(OCH_2CH_2)_nOH$ where n ranges from about 6 to about 20.

9. A composition as claimed in claim 5 wherein the polyalkylene glycol is a polyethylene glycol of the formula $H(OCH_2CH_2)_nOH$ where n ranges from about 6 to about 20.

10. A composition as claimed in claim 6 wherein the polyalkylene glycol is a polyethylene glycol of the formula $H(OCH_2CH_2)_nOH$ where n ranges from about 6 to about 20.

11. A composition as claimed in claim 1 wherein the polyalkylene glycol is a polypropylene glycol of the formula $H(OC_3H_6)_nOH$ where n ranges from about 4 to about 10.

12. A composition as claimed in claim 5 wherein the polyalkylene glycol is a polypropylene glycol of the formula $H(OC_3H_6)_nOH$ where n ranges from about 4 to about 10.

13. A composition as claimed in claim 6 wherein the polyalkylene glycol is a polypropylene glycol of the formula $H(OC_3H_6)_nOH$ where n ranges from about 4 to about 10.

14. A composition as claimed in claim 1 wherein the organophosphorus compound is diethyl N,N-bis(2-hydroxyethyl)aminomethyl-phosphonate.

* * * * *